United States Patent [19]

Oomen et al.

[11] Patent Number: 4,740,403
[45] Date of Patent: Apr. 26, 1988

[54] COMPOSITE BODY

[75] Inventors: Joris J. C. Oomen; Jan W. Rouwendal; Ronald Hehemann, all of Eindhoven, Netherlands

[73] Assignee: U.S. Philips Corporation, New York, N.Y.

[21] Appl. No.: 1,068

[22] Filed: Jan. 7, 1987

[30] Foreign Application Priority Data

Jan. 8, 1986 [NL] Netherlands ............... 8600020

[51] Int. Cl.⁴ ........................... B32B 9/04
[52] U.S. Cl. ........................ 428/35; 428/472; 428/698; 501/127
[58] Field of Search ........... 501/127; 428/35, 36, 428/698, 699, 472, 469, 701

[56] References Cited

U.S. PATENT DOCUMENTS

| | | | |
|---|---|---|---|
| 2,282,106 | 5/1942 | Underwood | 428/472 X |
| 2,780,561 | 2/1957 | Forge | 428/472 X |
| 2,948,992 | 8/1960 | Oldfield et al. | 428/472 X |
| 3,340,026 | 9/1967 | Keivak | 428/472 X |
| 3,404,968 | 10/1968 | Rohrer | 428/472 X |
| 3,652,304 | 3/1972 | Daniels | 501/127 X |
| 3,719,531 | 3/1973 | Dziecivch et al. | 501/127 X |
| 4,055,451 | 10/1977 | Cockbain et al. | 428/472 X |
| 4,109,031 | 8/1978 | Marscher | 428/472 X |
| 4,371,588 | 2/1983 | Kyle | 428/472 X |
| 4,532,179 | 7/1985 | Takami et al. | 428/472 X |
| 4,595,663 | 6/1986 | Krohn et al. | 501/127 X |
| 4,637,960 | 1/1987 | Hatakeyama et al. | 428/472 X |

Primary Examiner—Nancy A. B. Swisher
Attorney, Agent, or Firm—Norman N. Spain

[57] ABSTRACT

The invention relates to a composite body comprising at least a first part of ceramic material which is connected to a second part of metallic material, of ceramic material or of a mixture of metallic and ceramic material by means of a connection material. The connection material contains besides $Al_2O_3$ also one of the oxides BaO, SrO, $Sc_2O_3$, $Y_2O_3$ and at least one rare earth oxide and has a composition lying within the following limits, expressed in mol. %:

$Al_2O_3$: 30–70
BaO: 0–20
SrO: 0–20
$Sc_2O_3$: 2–40
$Y_2O_3$: 2–40
rare earth oxide: 5–40.

According to the invention, the connection material further contains 5–30 mol. % of $HfO_2$. Thus, the formation of β-aluminate during the formation of the composite body is avoided.

3 Claims, 1 Drawing Sheet

COMPOSITE BODY

BACKGROUND OF THE INVENTION

The invention relates to a composite body comprising at least a first part of ceramic material which is connected to a second part of metallic material, of ceramic material or of a mixture of metallic and ceramic material by means of a connection material which contains besides $Al_2O_3$ also one of the oxides BaO, SrO, $Sc_2O_3$, $Y_2O_3$ and at least one rare earth oxide and whose composition lies within the following limits, expressed in mol.%:

$Al_2O_3$: 35-70
BaO: 0-20
SrO: 0-20
$Sc_2O_3$: 2-40
$Y_2O_3$: 2-40
rare earth oxide 5-40.

A ceramic material is to be understood to mean in this description and the appended claims a crystalline oxidic material at least containing alumina. This may be, for example, monocrystalline sapphire. Another possibility is densely dintered polycrystalline alumina ot yttrium aluminum garnet. These materials, which are suitable as a wall material for discharge vessels of high-pressure discharge lamps, can be heated for a long time to about 1300° C. and at such high temperatures have a high resistance to attack by alkali metals and halides. Heating for a long time to above 1300° C. generally leads to a substantial evaporation of the relevant materials. Heating for a short time to 1750° to 1800° C. is possible, however, without disadvantageous consequences. Heating to above 1750° to 1800° C., even for a short time, leads to the aforementioned evaporation, however, to a great extent, and even to spontaneous formation of ruptures.

Rare earth oxides are to be understood to mean the following oxides: $Gd_2O_3$, $Tb_2O_3$, $Dy_2O_3$, $Ho_2O_3$, $Er_2O_3$, $Eu_2O_3$, $Pr_2O_3$, $Ce_2O_3$, $Sm_2O_3$, $Tm_2O_3$, $Yb_2O_3$, $Lu_2O_3$, $La_2O_3$, $Nd_2O_3$.

A composite body of the kind mentioned in the opening paragraph is known from European Patent Application No. 0060582A1. The known connection materials preferably contains BaO or SrO as a constituent inhibiting the crystal growth in a quantity of at most 20 mol.%. Such a composite body may be a high-pressure discharge lamp provided with a discharge vessel having a ceramic wall through which a current supply member is passed, which is connected thereto in a gas-tight manner by means of the connection material. Frequently used high-pressure discharge lamps are high-pressure sodium lamps and high-pressure metal halide lamps. In both lamp types, the wall of the discharge vessel is loaded at a high temperature in the operating condition and the filling of the discharge vessel is partly ionized. The connection material used in such lamps therefore should be resistant to attack by sodium and metal halides at high temperatures.

A gas-tight connection providing a high resistance to the attack by sodium and halides can be obtained by means of the known connection material. In general, a gas-tight connection is obtained by a fine crystallization of the connection material. It should be noted that in general the thermal expansion coefficients of the interconnected parts are different so that stresses may be produced in the connection material. In the case of a fine crystallization, the possibility of crack formation is smaller than in the case of coarse crystalline connection material.

A further advantage of a fine crystalline connection material is that during the crystallization process the possibility of occlusions and micro-cracks is considerably smaller than in coarse crystallized connection material.

The known connection material satisfies to a great extent the requirement of fine crystallization, inter alia due to the preferably added constituents BaO and SrO, respectively, which have an inhibiting effect on the crystal growth. However, it has been found that the known connection material in the connection with an alumina-containing ceramic part of the composite body may lead to formation of β-aluminate structures. A β-aluminate crystal structure is highly sensitive to attack by especially sodium and so very undesirable in the case of a high-pressure discharge lamp with sodium as filling constituent.

SUMMARY OF THE INVENTION

The invention has for its object to provide a measure by which the connection between the parts of a composite body remains free from a β-aluminate crystal structure while maintaining the favorable crystallization properties of the connection material.

For this purpose, according to the invention, a composite body of the kind mentioned in the opening paragraph is characterized in that the connection material further contains $HfO_2$ in a quantity lying within the limits, expressed in mol.%, of 5-30. Advantages inherent in a composite body according to the invention are the absence of β-aluminate crystal structures, the fine crystalline structure of the connection material and a melting temperature of the connection material which is lower than 1750° C. The fine crystalline structure can be obtained even while omitting the constituents BaO and SrO, respectively. This is an additional advantage of the invention because it has been found that these constituents are conducive to the formation of a β-aluminate crystal structure.

The addition of $HfO_2$ also influences the viscosity of the connection material. With the use of quantities $Hf_2O_3$ of more than 30 mol.%, the connection material obtains such a high viscosity that flow does not or substantially not occur any longer in small gap-shaped spaces. Such large quantities of $HfO_2$ are therefore not used.

Quantities of $HfO_2$ smaller than 5 mol.% lead to such low concentrations that the formation of β-aluminate is not excluded and are therefore not used.

BRIEF DESCRIPTION OF THE DRAWING

In the drawing, the sole FIGURE is a cross-sectional view of an end of a high-pressure sodium lamp employing the composite body of the invention.

DETAILED DESCRIPTION OF THE INVENTION

Figure 1:
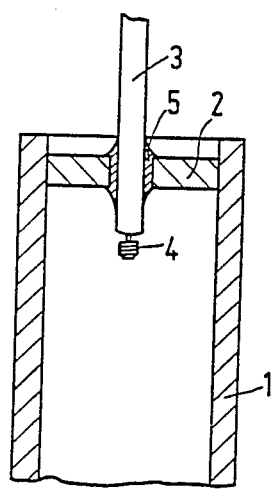

The invention will now be described in greater detail by reference to the drawing and the following examples and tables.

The connection material of the invention preferably contains in a composite body $HfO_2$ in a quantity within the limits, expressed in mol.%, of 10-20 because in this range the lowest melting points of connection material compositions occur and the flow capacity at the relevant melting points is so large that a good penetration into gap-shaped spaces takes place between the parts to be interconnected.

A further decrease of the melting point of the connection material can be attained if the connection material contains 1-6 mol.% of $B_2O_3$. The remaining favorable properties of the connection material are then maintained. By means of these connection materials, the composite body to the invention can be obtained at a comparatively low temperature. Therefore, a composite body according to the invention is to be preferred, which comprises such a connection material containing $B_2O_3$.

Examples of composite bodies according to the invention will now be described more fully with reference to a drawing.

In the drawing, an end of a high-pressure sodium lamp is shown. The lamp is known per se, for example, from U.S. Pat. No. 3,716,743 and will not be described further herein. The lamp end shown is a composite body comprising a tube 1 and a disk 2, both of densely sintered alumina (dsa). A hollow niobium sleeve 3 is sealed in a gas-tight manner into the disk 2. An electrode 4 comprising a tungsten pin provided with a tungsten helix is secured in the sleeve 3 by means of titanium solder. The sleeve 3 is connected in a gas-tight manner to the disk 2 and the tube 1 by means of connection material 5 according to the invention.

EXAMPLES OF CONNECTION MATERIALS

A large number of connection materials suitable for use in a composite body according to the invention were obtained by fusing a mixture of constituent oxides in a high-frequency furnace to a vitreous mass and to a vitreous mass with small crystals, respectively. After cooling, this mass is pulverized and the connection material thus obtained is then shaped into the form of rings by adding a binder to the powder and pressing the powder into the desired form and then sintering it.

The starting material consisted of an oxide mixture chosen from alumina having a purity of 99.8%, scandium oxide, yttrium oxide, lanthanum oxide, neodymium oxide, all also having a purity of 99.8%, barium oxide, strontium oxide and hafnium oxide each having a purity of 99.9% and boron oxide having a purity of more than 99.995%. Instead of the said oxides, compounds may also be used which form these oxides when heated. In the Tables I and II, the compositions (in mol.%) of the connection materials obtained are indicated. The tables further indicate for each connection material the melting temperature $T_s$ (in °C.). The melting temperature is found to vary from 1560° to 1700° C.

TABLE I

| No. | $Al_2O_3$ | BaO | $Sc_2O_3$ | $Y_2O_3$ | $Nd_2O_3$ | $HfO_2$ | $T_s$ in °C. |
|---|---|---|---|---|---|---|---|
| 1 | 60 | 0 | 19.25 | 5.25 | 10.50 | 5 | 1620 |
| 2 | 60 | 6 | 15.95 | 4.35 | 8.70 | 5 | 1595 |
| 3 | 55 | 0 | 19.25 | 5.25 | 10.5 | 10 | 1660 |
| 4 | 50 | 0 | 19.25 | 5.25 | 10.5 | 15 | 1630 |
| 5 | 50 | 12 | 12.65 | 3.45 | 6.90 | 15 | 1600 |
| 6 | 45 | 0 | 19.25 | 5.25 | 10.5 | 20 | 1660 |
| 7 | 55 | 0 | 12.25 | 8.75 | 14.0 | 10 | 1655 |
| 8 | 50 | 12 | 8.05 | 5.75 | 9.20 | 15 | 1605 |
| 9 | 60 | 0 | 8.75 | 8.75 | 17.5 | 5 | 1680 |
| 10 | 60 | 6 | 7.25 | 7.25 | 14.50 | 5 | 1640 |
| 11 | 45 | 0 | 8.75 | 8.75 | 17.5 | 20 | 1665 |
| 12 | 45 | 6 | 7.25 | 7.25 | 14.5 | 20 | 1650 |
| 13 | 40 | 0 | 8.75 | 8.75 | 17.5 | 25 | 1690 |
| 14 | 40 | 6 | 7.25 | 7.25 | 14.5 | 25 | 1660 |
| 15 | 55 | 12 | 5.75 | 5.75 | 11.50 | 10 | 1630 |
| 16 | 50 | 12 | 5.75 | 5.75 | 11.50 | 15 | 1640 |
| 17 | 60 | 18 | 4.25 | 4.25 | 8.50 | 5 | 1660 |
| 18 | 50 | 18 | 4.25 | 4.25 | 8.50 | 15 | 1645 |
| 19 | 45 | 18 | 4.25 | 4.25 | 8.50 | 20 | 1655 |
| 20 | 40 | 18 | 4.25 | 4.25 | 8.50 | 25 | 1675 |

TABLE II

| No. | $Al_2O_3$ | BaO | $Sc_2O_3$ | $Y_2O_3$ | $La_2O_3$ | $HfO_2$ | $B_2O_3$ | $T_s$ in °C. |
|---|---|---|---|---|---|---|---|---|
| 21 | 60 | 6 | 15.95 | 4.35 | 8.70 | 5 | — | 1620 |
| 22 | 50 | 6 | 15.95 | 4.35 | 8.70 | 15 | — | 1620 |
| 23 | 45 | 6 | 15.95 | 4.35 | 8.70 | 20 | — | 1630 |
| 24 | 40 | 6 | 15.95 | 4.35 | 8.70 | 25 | — | 1640 |
| 25 | 55 | 12 | 12.65 | 3.45 | 6.90 | 10 | — | 1635 |
| 26 | 50 | 12 | 12.65 | 3.45 | 6.90 | 15 | — | 1635 |
| 27 | 60 | 18 | 9.35 | 2.55 | 5.10 | 5 | — | 1645 |
| 28 | 55 | 18 | 9.35 | 2.55 | 5.10 | 10 | — | 1650 |
| 29 | 45 | 18 | 9.35 | 2.55 | 5.10 | 20 | — | 1675 |
| 30 | 40 | 18 | 9.35 | 2.55 | 5.10 | 25 | — | 1680 |
| 31 | 60 | 6 | 13.05 | 4.35 | 11.60 | 5 | — | 1590 |
| 32 | 55 | 12 | 8.05 | 5.75 | 9.20 | 10 | — | 1605 |
| 33 | 55 | 12 | 5.75 | 5.75 | 11.50 | 10 | — | 1595 |
| 34 | 60 | 12 | 3.45 | 8.05 | 11.50 | 5 | — | 1665 |
| 35 | 54.45 | 11.88 | 12.52 | 3.42 | 6.83 | 9.9 | 1 | 1615 |
| 36 | 53.90 | 11.76 | 12.40 | 3.38 | 6.76 | 9.8 | 2 | 1615 |
| 37 | 53.35 | 11.64 | 12.27 | 3.35 | 6.69 | 9.7 | 3 | 1605 |
| 38 | 52.80 | 11.52 | 12.15 | 3.31 | 6.62 | 9.6 | 4 | 1600 |
| 39 | 52.25 | 11.40 | 12.02 | 3.28 | 6.55 | 9.5 | 5 | 1565 |
| 40 | 60 | 0 | 19.25 | 5.25 | 10.5 | 5 | — | 1645 |
| 41 | 55 | 0 | 19.25 | 5.25 | 10.5 | 10 | — | 1630 |
| 42 | 50 | 0 | 19.25 | 5.25 | 10.5 | 15 | — | 1630 |
| 43 | 45 | 0 | 19.25 | 5.25 | 10.5 | 20 | — | 1645 |
| 44 | 40 | 0 | 19.25 | 5.25 | 10.5 | 25 | — | 1645 |
| 45 | 55 | 0 | 15.75 | 5.25 | 14.0 | 10 | — | 1590 |
| 46 | 55 | 0 | 12.25 | 8.75 | 14.0 | 10 | — | 1615 |
| 47 | 55 | 0 | 8.75 | 8.75 | 17.5 | 10 | — | 1670 |

By means of the connection materials indicated in the above tables, connections can be established, for example, between molybdenum and polycrystalline densely sintered (pca), niobium and pca, tantalum and pca and two parts of pca to each other and connections of yttrium aluminum and garnet and sapphire to each other and to the said metals.

Discharge vessels of high-pressure sodium lamps of the kind as shown in the drawing were provided with a gas-tight connection between the niobium sleeve and the pca sleeve while using the connection materials indicated in Tables I and II.

The connection is established by a sealing process which is carried out as follows. First the parts to be interconnected are joined in the desired positions and provided near the connection area with a ring of the connection material chosen. This assembly is heated in a furnace in 15 seconds from room temperature to a temperature of 1250° C., is held at this temperature for 60 seconds, is then brought in 30 seconds to a temperature lying 50° C. above the sealing temperature (Ts) and is held for 20 seconds at this temperature. Subsequently, the assembly is cooled in the furnace to 1250° C., is held for 120 seconds at this temperature, is cooled in the furnace to 1125° C., is held at this temperature for 60 seconds and is then cooled to room temperature in the furnace in the switched-off state.

The discharge vessels obtained were found to have a good gas-tight connection between the Nb sleeve and the dsa disk, while the connection material was found to have fine crystalline structure.

What is claimed is:

1. A composite body at least comprising a first part of ceramic material which is connected to a second part of metallic material, of ceramic material or of a mixture of metallic and ceramic material by means of a connection material which contains $Al_2O_3$, one of the group consisting of BaO, SrO, $Sc_2O_3$ and $Y_2O_3$ and at least one rare earth oxide and oxides whose composition lies within the following limits, expressed in mol.%:

$Al_2O_3$: 35–70
BaO: 0–20
SrO: 0–20
$Sc_2O_3$: 2–40
$Y_2O_3$: 2–40
rare earth oxide: 5–40, characterized in that the connection material further contains $HfO_2$ in a quantity lying within the limits, expressed in mol.%, of 5–30.

2. A composite body as claimed in claim 1, characterized in that the connection material contains $HfO_2$ in a quantity within the limits, expressed in mol.%, of 10–20.

3. A composite body as claimed in claim 1, characterized in that the connection material contains 1–6 mol.% of $B_2O_3$.

* * * * *